(12) United States Patent
Li

(10) Patent No.: US 10,101,901 B2
(45) Date of Patent: Oct. 16, 2018

(54) METHOD FOR DELETING EMAIL AND TERMINAL DEVICE

(71) Applicant: Hisense Mobile Communications Technology Co., Ltd., Qingdao, Shandong (CN)

(72) Inventor: Yuanyuan Li, Shandong (CN)

(73) Assignee: Hisense Mobile Communications Technology Co., Ltd., Qingdao (CN)

( * ) Notice: Subject to any disclaimer, the term of this patent is extended or adjusted under 35 U.S.C. 154(b) by 447 days.

(21) Appl. No.: 14/978,878

(22) Filed: Dec. 22, 2015

(65) Prior Publication Data

US 2016/0266758 A1   Sep. 15, 2016

(30) Foreign Application Priority Data

Mar. 11, 2015   (CN) .......................... 2015 1 0106377

(51) Int. Cl.
*G06F 3/0482* (2013.01)
*G06F 3/0488* (2013.01)
(Continued)

(52) U.S. Cl.
CPC .......... *G06F 3/0488* (2013.01); *G06F 3/0482* (2013.01); *G06F 3/04817* (2013.01); *H04M 1/274525* (2013.01)

(58) Field of Classification Search
CPC .... G06F 3/041; G06F 3/0416; G06F 3/04817; G06F 3/0482; G06F 3/0483;
(Continued)

(56) References Cited

U.S. PATENT DOCUMENTS

2009/0093277 A1* 4/2009 Lee ................. H04M 1/274525
455/566
2010/0295805 A1* 11/2010 Shin ..................... G06F 3/04883
345/173
(Continued)

FOREIGN PATENT DOCUMENTS

CN   102439555 A   5/2012
CN   103235688 A   8/2013
(Continued)

OTHER PUBLICATIONS

First Office Action dated Aug. 1, 2018 for China Patent Application No. 201510106377X with English Translation and Supplemental Search (20 pp.).

*Primary Examiner* — Rinna Yi
(74) *Attorney, Agent, or Firm* — Brinks Gilson & Lione

(57) ABSTRACT

The present disclosure provides a method for deleting an email from a terminal device running Android system. The method includes: acquiring sliding trace information of a touch point; acquiring, if a sliding operation of the touch point meets a pre-determined condition, initial coordinates of the control in a first layout file of an email interface where the touch point is located, target coordinates of a deletion button in a second layout file, and a preset interface shift threshold; shifting, according to the interface shift threshold, the initial coordinates of the control in a preset direction, and shifting, according to the interface shift threshold and a width value of the deletion button, the deletion button in a preset direction to the target coordinates of the deletion button; and deleting the email when a touch point is detected in a deletion button region of the email interface.

6 Claims, 11 Drawing Sheets

(51) Int. Cl.
*H04M 1/2745* (2006.01)
*G06F 3/0481* (2013.01)

(58) Field of Classification Search
CPC .. G06F 3/0484; G06F 3/04845; G06F 3/0486; G06F 3/0488; G06F 3/04886; H04M 1/274525

See application file for complete search history.

(56) References Cited

U.S. PATENT DOCUMENTS

| | | | |
|---|---|---|---|
| 2014/0033032 A1* | 1/2014 | Reynolds | G06F 3/048 715/702 |
| 2014/0223347 A1* | 8/2014 | Seo | G06F 3/0482 715/769 |
| 2015/0346916 A1* | 12/2015 | Jisrawi | G06F 3/04817 715/752 |

FOREIGN PATENT DOCUMENTS

| | | |
|---|---|---|
| CN | 103873575 A | 6/2014 |
| CN | 104035715 A | 9/2014 |
| CN | 104133639 A | 11/2014 |
| WO | WO 2015/003005 A1 | 1/2015 |

\* cited by examiner

METHOD FOR DELETING EMAIL AND TERMINAL DEVICE

PRIORITY STATEMENT

This application claims the priority benefit of Chinese Patent Application No. 201510106377.X filed on Mar. 11, 2015, the disclosure of which is incorporated herein in its entirety by reference.

BACKGROUND

The present disclosure relates to the field of ANDROID™ terminals, and in particular, to a method for deleting an email and a terminal device.

RELATED ART

With the scientific and technological development and ubiquitous network coverage, emails are favored by people owing to the advantages of convenience and rapidness, and have become an important communication manner of people. However, when the quantity of emails in a mailbox increases, a user may need to delete some useless emails, so as to receive a new email. At present, in an ANDROID™ platform, an email in a terminal device is often deleted by means of a long-press on the content of the email to be deleted and a deletion operation performed on a popup deletion menu; or through selecting the email to be deleted, then clicking a deletion button at the bottom of a screen, and making confirmation on a popup deletion interface.

For an existing ANDROID™ platform, such an email deletion method is operationally complex, and has numerous steps. In addition, during selection among a popup action menu, there are often multiple action options, which easily cause a user to perform a mis-operation, thereby leading to a problem of a poor user experience.

SUMMARY

According to an aspect of the present disclosure, a terminal device may include a touch screen, a processor readable storage medium including a set of instructions for deleting an email; and a processor in communication with the storage medium and the touch screen. When executing the set of instructions under an ANDROID™ system, the processor is directed to: detect a sliding operation on a touch point on an email interface displayed on the touch screen in a preset direction; when the sliding operation on the touch point meets a pre-determined condition: acquire initial coordinates of a control in a first layout file of the email interface where the touch point is located; acquire target coordinates of a deletion button in a second layout file of the email interface; acquire a preset interface shift threshold; shift, according to the interface shift threshold, the initial coordinates of the control in the first layout file in the preset direction, and shift, according to the interface shift threshold and a width value of the deletion button, the deletion button in a preset direction to the target coordinates of the deletion button; and deleting, when detecting a touch point in a deletion button region of the email interface, a target email that corresponds to the email interface.

According to another aspect of the present disclosure, a method for deleting an email may include detecting, by a terminal device that includes a touch screen and is installed with an ANDROID™ system, a sliding operation on a touch point on an email interface displayed on the touch screen in a preset direction; when the sliding operation on the touch point meets a pre-determined condition: acquiring, by the terminal device, initial coordinates of a control in a first layout file of the email interface where the touch point is located; acquiring, by the terminal device, target coordinates of a deletion button in a second layout file of the email interface; acquiring, by the terminal device, a preset interface shift threshold; shifting, by the terminal device according to the interface shift threshold, the initial coordinates of the control in the first layout file in the preset direction, and shifting, by the terminal device according to the interface shift threshold and a width value of the deletion button, the deletion button in a preset direction to the target coordinates of the deletion button; and deleting, by the terminal device when detecting a touch point in a deletion button region of the email interface, a target email that corresponds to the email interface.

According to another aspect of the present disclosure, a method for deleting an email, may include detecting, by a terminal device with a touch screen and under an ANDROID™ system, a touch and slide operation on the touch screen over a target email thereon, wherein the touch and slide operation drags the target email towards a side of the terminal device; presenting, by the terminal device, a touch button for deleting the target email in a region where the email being dragged away; detecting, by the terminal device, a touch operation for the touch button; and deleting, by the terminal device, a visual presentation of the target email on the screen of the terminal device.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

Embodiments of the present disclosure provide a method for deleting an email and a terminal device, so as to solve a problem in an existing ANDROID™ platform that an email deletion method is operationally complex and easily causes a mis-operation, leading to a poor user experience.

Figure 6:
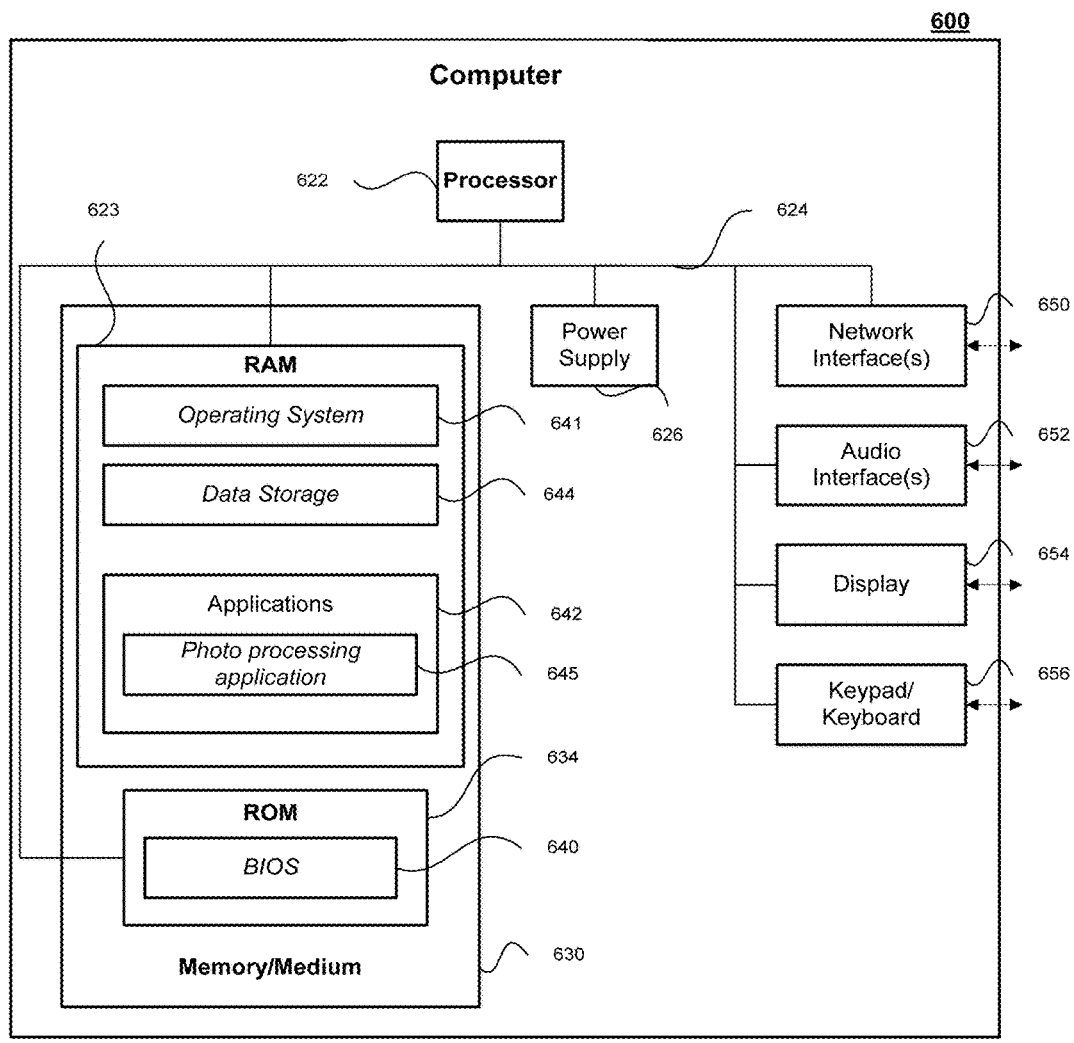
FIG. 6 is a schematic diagram illustrating an terminal device.

FIG. 6 is a schematic diagram illustrating an example of a terminal device that may implement methods introduced in the present disclosure. The terminal device may execute methods and software systems introduced in the present disclosure. A terminal device 600 may be a computing device capable of executing a software system. The terminal device 600 may, for example, be a device such as a personal desktop computer or a portable device, such as a camera, a laptop computer, a tablet computer, a cellular telephone, or a smart phone.

The terminal device 600 may vary in terms of capabilities or features. Claimed subject matter is intended to cover a wide range of potential variations. For example, the terminal device 600 may include am image processing hardware, such as a camera and/or a webcam. It may also include and audio interface 652, a network interface 650, a keypad/keyboard 656 and a display 654, such as a liquid crystal display (LCD), or a display with a high degree of functionality, such as a touch-sensitive color 2D or 3D display. In contrast, however, as another example, a web-enabled terminal device 600 may include one or more physical or virtual keyboards, and mass storage medium 630. The terminal device may further include power supply 626 for providing power to various components.

The terminal device 600 may also include or may execute a variety of operating systems 641. The terminal device 600 may include or may execute a variety of possible applications 642, such as a photo processing application 645. An application 642 may enable communication with other devices via a network, such as communicating with another computer or terminal device 600 via a network. The terminal 600 may also include, as part of memory/medium system 630, a RAM 623 for storing, for example, the operating systems 641, the applications 642, and data 644. The memory/medium system 630 may further include ROM 634 for storing, for example, BIOS information 640.

Further, the terminal device 600 may include one or more non-transitory processor-readable storage media 630 and one or more processors 622 in communication with the non-transitory processor-readable storage media 630. For example, the non-transitory processor-readable storage media 630 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 630 may store sets of instructions, or units and/or modules that include the sets of instructions, for conducting operations and/or method steps described in the present disclosure. Alternatively, the units and/or modules may be hardware (e.g., circuitry and circuits configured to perform functions of the units and/or module) disposed in the terminal device 600 configured to conduct operations and/or method steps described in the present disclosure. The one or more processors may be configured to execute the sets of instructions and perform the methods and/or operations in example embodiments of the present disclosure.

Merely for illustration, only one processor will be described in terminal devices that execute operations and/or method steps in the following example embodiments. However, it should be note that the terminal devices in the present disclosure may also include multiple processors, thus operations and/or method steps that are performed by one processor as described in the present disclosure may also be jointly or separately performed by the multiple processors. For example, if in the present disclosure a processor of an terminal device executes both step A and step B, it should be understood that step A and step B may also be performed by two different processors jointly or separately in the terminal device (e.g., the first processor executes step A and the second processor executes step B, or the first and second processors jointly execute steps A and B).

Figure 1:
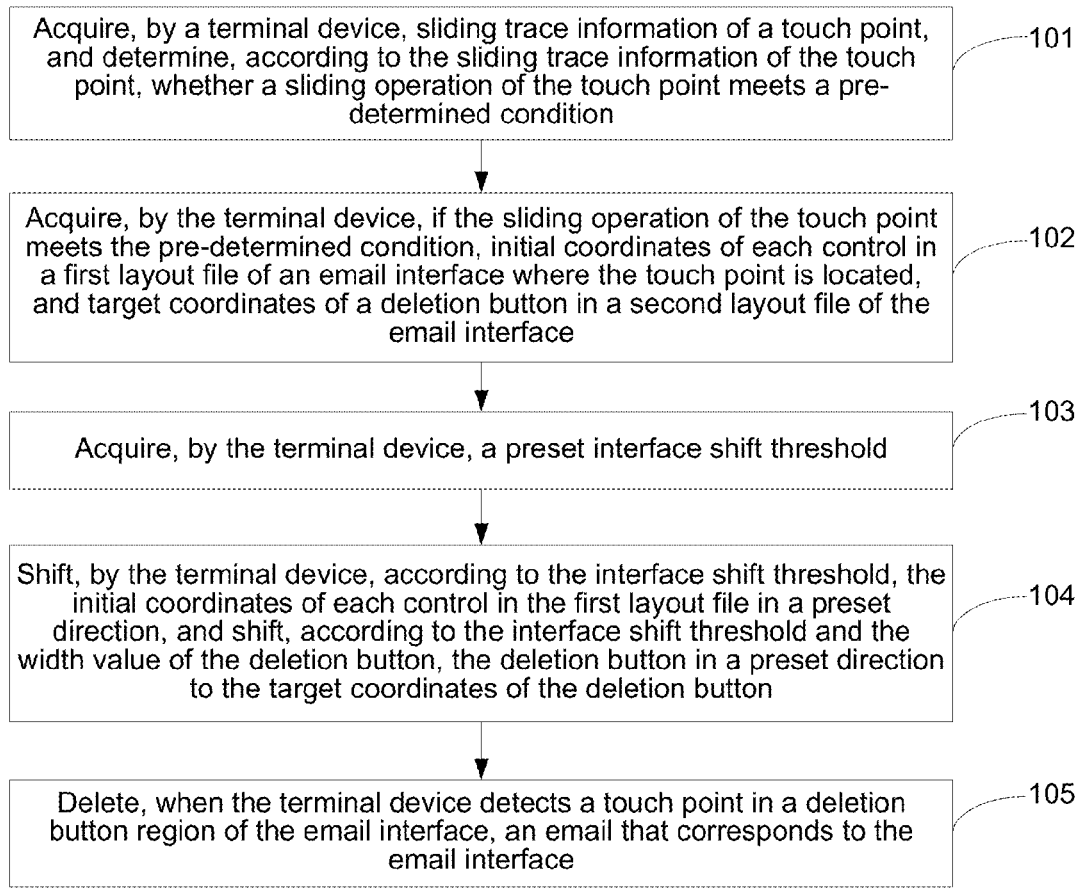
FIG. 1 is a schematic flowchart of a method for deleting an email according to an embodiment of the present disclosure.

FIG. 1 is a flow chart illustrating a method for deleting an email provided by this embodiment of the present disclosure. The method may be implemented as a set of instructions and stored in the storage medium 630 of the apparatus 600. The processor 622 may execute the set of instructions to perform operations of the method. For example, the processor may execute the set of instructions when the terminal device detects that a touch point slides in a preset direction on the email interface that is currently displayed by the terminal device. Here the touch point may be a point on a touch screen of the terminal device that is touched and/or pressed by a user of the terminal device. The preset direction is set by the terminal device in advance, which may be towards the left or towards the right, and is not limited in the present disclosure. When the touch point slides is detected, the terminal device may:

101: Acquire, by the terminal device, sliding trace information of a touch point, and determine, according to the sliding trace information of the touch point, whether a sliding operation of the touch point meets a pre-determined condition.

The terminal device may be an electronic device, such as terminal device 600, that is installed with an ANDROID™ system and has an email function, such as a smart phone, a tablet computer, a notebook computer, an ultra-mobile personal computer (UMPC for short), a netbook, and a personal digital assistant (PDA for short).

Specifically, when a user enters an email interface and needs to perform an operation on an email therein, the terminal device may acquire sliding trace information of a touch point, and determine whether a sliding operation of the touch point meets a pre-determined condition, so as to determine whether to perform a corresponding deletion operation on a selected email. The sliding trace information may be acquired by a screen of the terminal device according to a sliding gesture of a user on the screen, or acquired by using a sensor on a screen of the terminal device. The sliding trace information of the touch point includes a sliding distance of the touch point.

It should be noted that, the email interface is displayed by means of invoking by a terminal device an OnDraw function therein, and displaying, according to coordinates of a control in an acquired layout file, the control on the email interface. Meanwhile, the invocation of the OnDraw function is a cyclic process. The terminal device periodically acquires, according to a preset frequency, coordinate information of a control in a layout file, and updates a position of the control on the email interface, thereby achieving a sliding effect.

In an exemplary embodiment, before step 101 is performed, the method further includes the following steps:

101*a*: Acquire, by the terminal device, a first layout file of an email interface of an email.

The email may be any email stored or downloaded in the terminal device or a remote server. The first layout file of an email interface of the email is configured to set a display mode of a control on an email interface of the email, for example, displaying on the email interface in a forms mode or a linear mode (in a vertical or horizontal direction). The first layout file includes at least one control, and a control in the first layout file is mainly used for defining required display content and positions (for example, content such as an subject, a sender and receiving time of an email, and positions thereof displayed on an email interface) in the first layout file. Meanwhile, a control in the first layout file may be considered as a necessary element constituting an email interface. Specifically, the control includes but is not limited to a button control, a text control and a picture control.

101*b*: Create, by the terminal device, according to the first layout file of the email interface of the email, a second layout file with the same content as the first layout file for the email, and add a layout parameter of a deletion button in the second layout file.

The first layout file and the second layout file having the same content means that control information included in the first layout file is exactly the same as control information included in the second layout file. The layout parameter of the deletion button includes target coordinates and layout information of the deletion button, and the layout information of the deletion button is used for indicating a display position of the deletion button on an email interface of the email.

It should be noted that, the target coordinates of the deletion button are coordinates of the deletion button when being fully displayed on an email interface.

For example, when a terminal device sets a deletion condition for deleting an email when the terminal device detects a touch point to slide towards the left by a user of the terminal device, the terminal device sets layout information of a deletion button as arranging the deletion button on a right end of an email interface, so as to display the deletion button on the right end of the email interface, thereby achieving an effect of following the email interface to slide out towards the left and displaying on the right end of the email interface. In this case, target coordinates of the deletion button shall meet a condition as shown in formula 1:

$$Z = x_b + W \qquad \text{(formula 1)},$$

where, Z is the width of a screen of the terminal device, $x_b$ is a transverse coordinate of target coordinates of the deletion button, and W is the width of the deletion button.

When a terminal device sets a deletion condition for deleting an email as detecting by the terminal device a touch point to slide towards the right, the terminal device sets layout information of a deletion button as arranging the deletion button on a left end of an email interface, so as to display the deletion button on the left end of the email interface, thereby achieving an effect of following the email interface to slide out towards the right and displaying on the left end of the email interface. When the deletion button is displayed on the left end of the email interface, a transverse coordinate thereof coincides with a transverse coordinate of an original point. In this case, a transverse (abscissa) coordinate of target coordinates of the deletion button is 0.

For example, when the width of a screen of a terminal device is 50 pixel points, and a deletion button has a width of 15 pixel points and a height of 10 pixel points, if a preset direction is towards the left, target coordinates of the deletion button that are obtained according to formula 1 are (35, 0, 15, 10); and if a preset direction is towards the right, target coordinates of the deletion button are (0, 0, 15, 10).

102: Acquire, by the terminal device, if the sliding operation of the touch point meets the pre-determined condition, initial coordinates of each control in a first layout file of an email interface where the touch point is located, and target coordinates of a deletion button in a second layout file of the email interface.

The target coordinates of the deletion button include a width value of the deletion button. Each control is defined as a rectangle in a terminal device, and coordinates thereof include four parameters, (x, y, w, h), where x is a transverse coordinate of an upper-left corner of the control, y is a longitudinal coordinate of the upper-left corner of the control, w is the width of the control, and h is the height of the control. It should be noted that, in the existing field of terminal devices, a point at an upper-left corner of a screen of a terminal device is used as an original point, and coordinates of a control are determined according to pixel points, where x and y are both a coordinate relative to the original point.

For example, if the screen resolution of a terminal device is M*N, that is, each row includes N pixels, and each column includes M pixels, when coordinates of a control are (x1, y1, w1, h1), it indicates that a distance from a transverse coordinate of a point at an upper-left corner of the control to the original point of the screen is x1 pixel points, and a distance from a longitudinal coordinate thereof to the original point is y1 pixel points, the width of the control is w1 pixel points, and the height thereof is h1 pixel points. It should be noted that, initial coordinates of the control are coordinates of the control when being currently displayed on the email interface.

103: Acquire, by the terminal device, a preset interface shift threshold.

The interface shift threshold is an offset of the email interface during each shift, which is set by the terminal device in advance.

104: Shift, by the terminal device, according to the interface shift threshold, the initial coordinates of each control in the first layout file in a preset direction, and shift, according to the interface shift threshold and the width value of the deletion button, the deletion button in a preset direction to the target coordinates of the deletion button.

For example, a terminal device acquires an interface shift threshold and initial coordinates of each control in a first layout file; shifts, according to the acquired interface shift threshold, the initial coordinates of each control in the first layout file in a preset direction; and obtains coordinates thereof after being shifted. The terminal device invokes an OnDraw function according to the coordinates of each control after being shifted, and updates each control in the first layout file on the email interface. Meanwhile, the terminal device calculates, according to the acquired interface shift threshold and the width value of the deletion button, and by using a calculation formula, coordinates of the deletion button after being shifted. The terminal device invokes an OnDraw function according to the coordinates of the deletion button after being shifted, and updates the deletion button on the email interface, so as to achieve sliding of the whole email content on the email interface in a preset direction while the deletion button follows the email content to slide out in a preset direction.

105: Delete, when the terminal device detects a touch point in a deletion button region of the email interface, an email that corresponds to the email interface.

In an exemplary embodiment, step 105 further includes the following steps:

105a: Shift, by the terminal device, when the terminal device detects a touch point in a region other than a deletion button region, and according to the interface shift threshold, coordinates of each control in the first layout file after being shifted, in an opposite direction of the preset direction, and shift, according to the interface shift threshold and the width value of the deletion button, target coordinates of the deletion button in an opposite direction of the preset direction, so as to achieve sliding of the whole email content on the email interface in an opposite direction of the preset direction while hiding the deletion button.

For example, when a terminal device displays, under control of a user, a deletion button on an email interface of an email to be deleted, if the user needs to delete the email, the user may touch the deletion button on the email interface of the email or any position within the deletion button region, and then the terminal device may delete a first layout file and a second layout file that correspond to the email interface; and if a user does not intend to delete the email, that is, a mis-operation of the user causes the deletion button to be displayed on the email interface of the email to be deleted, then a region other than the deletion button region may be touched on the terminal device, to control the deletion button and the whole email content to slide in an opposite direction of the preset direction, thereby hiding the deletion button, and making the email interface of the email to be deleted return to an original status. It should be noted that, a sliding effect of hiding the deletion button is corresponding to an effect of sliding out the deletion button.

For the method provided by this embodiment of the present disclosure, a terminal device acquires sliding trace information of a touch point; determines, according to the sliding trace information of the touch point, whether a sliding operation of the touch point meets a pre-determined condition; acquires, if the sliding operation of the touch point meets the pre-determined condition, initial coordinates of each control in a first layout file of an email interface where the touch point is located, and target coordinates of a deletion button in a second layout file of the email interface; then acquires a preset interface shift threshold; shifts, according to the preset interface shift threshold, the initial coordinates of each control in the first layout file in a preset direction, and shifts, according to the interface shift threshold and the width value of the deletion button, the deletion button in a preset direction to the target coordinates of the deletion button; and deletes, when the mobile terminal detects a touch point in a deletion button region of the email interface, an email that corresponds to the email interface.

As shown above, in the present disclosure, when a terminal device determines that a sliding operation of a touch point meets a pre-determined condition, the terminal device shifts, according to an acquired interface shift threshold, initial coordinates of each control in a first layout file in a preset direction, and shifts, according to the acquired interface shift threshold and a width value of a deletion button, the deletion button in a preset direction to target coordinates of the deletion button, so as to allow the whole email content on an email interface to slide in a preset direction while a deletion button is displayed on the email interface for deleting a selected email, thereby achieving deletion of a selected email by means of sliding on the terminal device, which is operationally convenient and fast, has a simple deletion interface, and effectively avoids a false triggering. In addition to solving a problem in an existing ANDROID™ platform that an email deletion method is operationally complex and easily causes a mis-operation, which leads to a poor user experience, the email deletion method is simplified and maintains consistent with a system style of a mobile phone, thereby improving the user experience.

Figure 2:
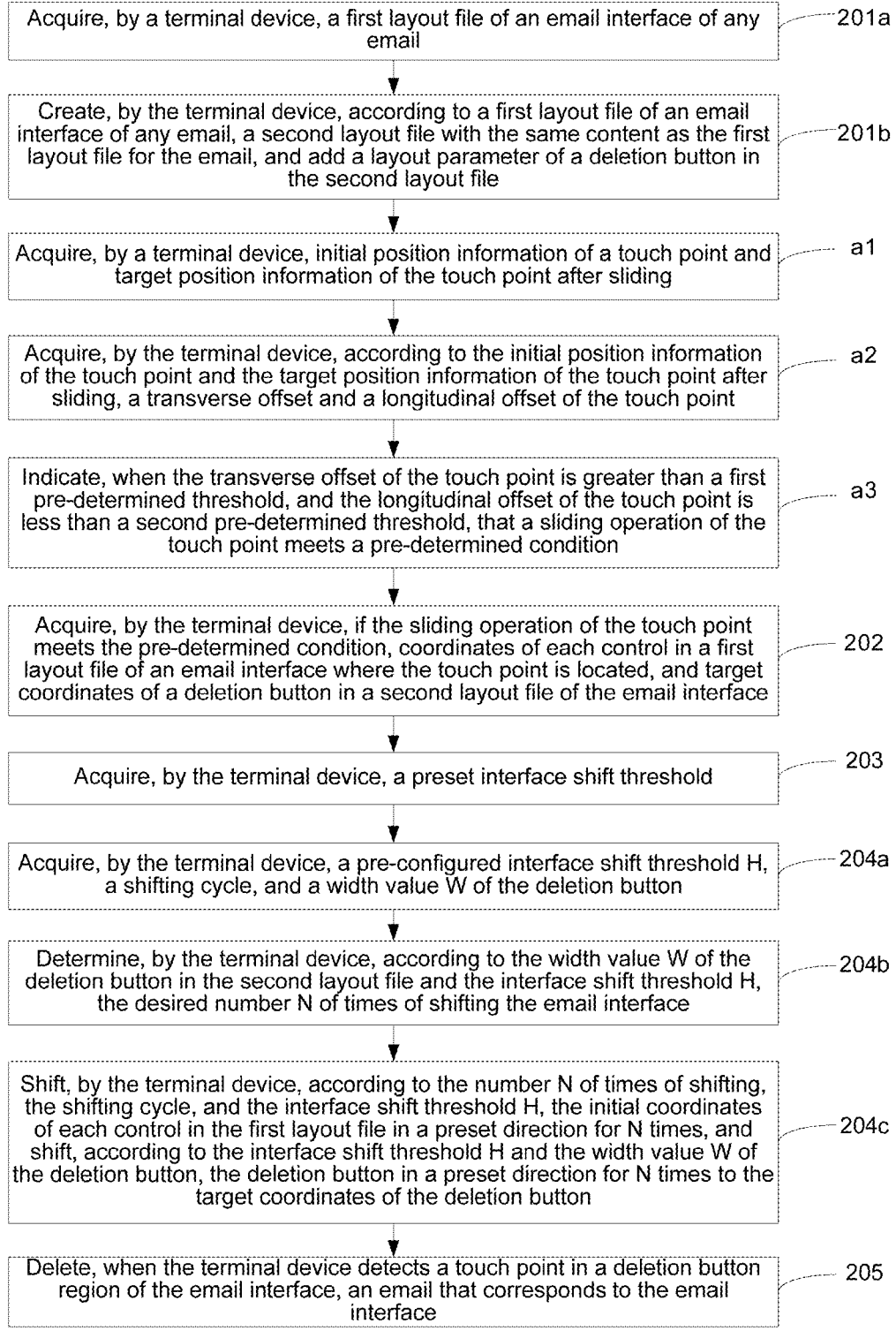
FIG. 2 is a schematic flowchart of another method for deleting an email according to an embodiment of the present disclosure.

FIG. 2 is a flowchart illustrating method for deleting emails according to another exemplary embodiment. The method may be implemented as a set of instructions and stored in the storage medium 630 of the apparatus 600. The processor 622 may execute the set of instructions to perform operations of the method. When the touch point slides is detected, the terminal device may:

201: Acquire, by a terminal device, sliding trace information of a touch point, and determine, according to the sliding trace information of the touch point, whether a sliding operation of the touch point meets a pre-determined condition.

In an exemplary embodiment, before step 201 is performed, the method further includes the following steps:

201a: Acquire, by a terminal device, a first layout file of an email interface of the email.

201b: Create, by the terminal device, according to a first layout file of an email interface of the email, a second layout file with the same content as the first layout file for the email, and add a layout parameter of a deletion button in the second layout file.

For example, for the description of step 201a and step 201b, refer to detailed description of step 101a and step 101b in the embodiment that corresponds to FIG. 1. The details are not described herein again.

In an exemplary embodiment, before step 201 is performed, the method further includes the following steps:

201c: Determine, by a terminal device, when the terminal device detects a screen touch event of touching a screen of the terminal device by a user, and according to the screen touch event, initial position information of a touch point on the screen of the terminal device.

201d: Determine, by the terminal device, according to position information of the touch point, whether the touch point is an effective touch point.

For example, effectiveness of a touch point is related to a preset direction of an email interface. If a terminal device sets a deletion condition for deleting an email as detecting by the terminal device a touch point to slide towards the right, when a distance between the touch point and a right end of a screen of the terminal device is less than a preset threshold, the touch point is an effective touch point; and if a terminal device sets a deletion condition for deleting an email as detecting by the terminal device a touch point to slide towards the left, when a distance between the touch point and a left end of a screen of the terminal device is less than a preset threshold, the touch point is an effective touch point, where the preset threshold is set by the terminal device in advance.

For example, when the preset threshold is 15 pixel points, and a preset sliding direction of an email interface is towards the right, if initial position information of a touch point that is detected on a screen of a terminal device is (5, 30), and a distance between the touch point and a left end of the screen of the terminal device is less than 15 pixel points, the touch point is an effective touch point.

201e: Record, by the terminal device, if the touch point is an effective touch point, the initial position information of the touch point.

In an exemplary embodiment, step 201 includes the following steps:

a1: Acquire, by the terminal device, initial position information of a touch point and target position information of the touch point after sliding.

For example, when a terminal device detects a touch point on a screen of the terminal device to slide on the screen of the terminal device, the terminal device records coordinates of an initial pixel point where the touch point is located, and coordinates of a target pixel point where the touch point is located after sliding.

a2: Acquire, by the terminal device, according to the initial position information of the touch point and the target position information of the touch point after sliding, a transverse offset and a longitudinal offset of the touch point.

The transverse offset of the touch point is an absolute value of a difference between a transverse coordinate of the target position information of the touch point after sliding and a transverse coordinate of the initial position information; and the longitudinal offset of the touch point is an absolute value of a difference between a longitudinal coordinate of the target position information of the touch point after sliding and a longitudinal coordinate of the initial position information. For example, when a terminal device determines that a touch point on a screen of the terminal device is an effective touch point, the terminal device records initial position information of the touch point as (45, 30), and when the touch point slides, target position information of the touch point after sliding is recorded as (30, 30). Then, it can be obtained through calculation that a transverse offset of the touch point is 15 pixel points and a longitudinal offset thereof is 0.

a3: Indicate, when the transverse offset of the touch point is greater than a first pre-determined threshold, and the longitudinal offset of the touch point is less than a second pre-determined threshold, that a sliding operation of the touch point meets a pre-determined condition.

For example, sliding of a touch point on a screen of a terminal device is not necessarily a corresponding operational instruction, and may also be unintentionally caused by a false triggering. Therefore, an offset of the touch point needs to be limited, so as to prevent a mis-operation resulting from a false triggering. For example, if a first preset threshold is 10 pixel points, and a second preset threshold is 5 pixel points, then a sliding operation of a touch point meets a pre-determined condition only when a transverse offset of the touch point is greater than 10 pixel points, and a longitudinal offset thereof is less than 5 pixel points.

202: Acquire, by the terminal device, if the sliding operation of the touch point meets the pre-determined condition, coordinates of each control in a first layout file of an email interface where the touch point is located, and target coordinates of a deletion button in a second layout file of the email interface.

203: Acquire, by the terminal device, a preset interface shift threshold.

For example, for the description of step 202 and step 203, refer to detailed description of step 102 and step 103 in the embodiment that corresponds to FIG. 1. The details are not described herein again.

204: Shift, by the terminal device, according to the interface shift threshold, the initial coordinates of each control in the first layout file in a preset direction, and shift, according to the interface shift threshold and a width value of the deletion button, the deletion button in a preset direction to the target coordinates of the deletion button.

In an exemplary embodiment, step 204 includes the following steps:

204a: Acquire, by the terminal device, a pre-configured interface shift threshold H, a shifting cycle, and a width value W of the deletion button.

The interface shift threshold H is an offset of an email interface during each shift, and the shifting cycle is a time interval of shifting an email interface. An email interface shifts by one interface shift threshold H at a certain time interval. For example, if a terminal device determines that a sliding operation of a touch point meets a pre-determined condition, the terminal device may start a timer. At a certain time interval (namely, a shifting cycle) set by the timer, the terminal device controls an email interface to shift by one interface shift threshold H in a preset direction.

204b: Determine, by the terminal device, according to the width value W of the deletion button and the interface shift threshold H, the desired number N of times of shifting the email interface.

N is a natural number greater than or equal to 1.

For example, when a terminal device sets that the deletion button slides out at a constant speed and each space on an email interface slides at a constant speed, H is a fixed value, and a corresponding specific calculation formula for N is as shown in formula 2:

$$N=W/H \quad \text{(formula 2)}.$$

Or when a terminal device sets that the deletion button slides out at accelerated or reduced speeds and each space in a corresponding email interface slides at accelerated or reduced speeds, H is a fixed value, and a corresponding specific calculation formula for N is as shown in formula 3:

$$W=\Sigma(H+(H\pm b)+\ldots+(H\pm i*b)+\ldots+(H\pm N*b)) \quad \text{(formula 3)},$$

where, b is a shift threshold of H, which is set by the terminal device in advance.

204c: Shift, by the terminal device, according to the number N of times of shifting, the shifting cycle, and the interface shift threshold H, the initial coordinates of each control in the first layout file in a preset direction for N times, and shift, according to the interface shift threshold H and the width value W of the deletion button, the deletion button in a preset direction for N times to the target coordinates of the deletion button.

Further, according to different methods of shifting an email interface, step 204c may be implemented in two manners.

In an exemplary embodiment, in a first implementation manner, step 204c includes the following steps:

b1: Calculate, by the terminal device, when the terminal device performs an ith shift on the email interface, and according to the interface shift threshold H and the current number i of times of shifting, a current offset L of the email interface.

The ith shift is any one shift performed on the email interface, and i=(0, 1, 2, . . . N).

For example, when a terminal device sets that the deletion button slides out at a constant speed and each space on an email interface slides at a constant speed, a specific calculation formula for L is as shown in formula 4:

$$L=H*i \quad \text{(formula 4)}.$$

When a terminal device sets that the deletion button slides out at accelerated or reduced speeds and each space on a corresponding email interface slides at accelerated or reduced speeds, a specific calculation formula for L is as shown in formula 5:

$$L=\Sigma(H+(H\pm b)+\ldots+(H\pm i*b)+\ldots+(H\pm N*b)) \quad \text{(formula 5)}.$$

b2: Obtain, by the terminal device, according to the current offset of the email interface and a transverse coordinate of the initial coordinates of each control in the first layout file, coordinates of each control in the first layout file after being shifted, and calculate, according to the current offset of the email interface and the width value of the deletion button, coordinates of the deletion button after being shifted.

For example, when a preset direction is towards the left, a specific calculation formula for a transverse coordinate $x_a'$ of any control in the first layout file after being shifted (a transverse coordinate of initial coordinates of the control is $x_a$) is as shown in formula 6:

$$x_a'=x_a-L \quad \text{(formula 6)}.$$

When a preset direction is towards the right, a specific calculation formula for a transverse coordinate $x_a'$ of any control in the first layout file after being shifted is as shown in formula 7:

$$x_a'=x_a+L \quad \text{(formula 7)}.$$

For example, when a preset direction is towards the left, to achieve an effect of a deletion button following the email content to slide out towards the left, the terminal device needs to make a transverse coordinate of the deletion button after being shifted coincide with a right end of the email interface after being shifted. Therefore, a specific calculation formula for a transverse coordinate $x_b'$ of the deletion button after being shifted (a transverse coordinate of target coordinates of the deletion button is $x_b$) is as shown in formula 8:

$$x_b'=x_b+W-L \quad \text{(formula 8)}$$

According to formula 1 and formula 8, it can be deduced that when a preset direction is towards the left, a transverse coordinate of a deletion button after being shifted may also be calculated by using a formula, $x_b'=Z-L$.

When a preset direction is towards the right, to achieve an effect of a deletion button following the email content to slide out towards the right, the terminal device needs to make a transverse coordinate of the deletion button after being shifted coincide with a left end of the email interface after being shifted. Therefore, a specific calculation formula for a transverse coordinate $x_b'$ of the deletion button after being shifted is as shown in formula 9:

$$x_b'=x_b-W+L \quad \text{(formula 9)}.$$

b3: Display, by the terminal device, according to the coordinates of each control in the first layout file after being shifted, each control in the first layout file on the email interface, and display, according to the coordinates of the deletion button after being shifted, the deletion button on the email interface.

In an exemplary embodiment, in a second implementation manner, step 204c includes the following steps:

c1: Acquire, by the terminal device, when i=1, current coordinates of each control in the first layout file, and current coordinates of the deletion button in the second layout file; obtain, by the terminal device, according to the interface shift threshold H and a transverse coordinate of initial coordinates of each control in the first layout file, coordinates of each control in the first layout file after being shifted, and calculate, according to the interface shift threshold H and a width value of the deletion button, coordinates of the deletion button after being shifted; and display, by the terminal device, according to the coordinates of each control in the first layout file after being shifted and the coordinates of the deletion button after being shifted, each control in the first layout file and the deletion button in the second layout file on the email interface.

c2: Acquire, when the terminal device performs an ith shift on the email interface, current coordinates of each control in the first layout file, and current coordinates of the deletion button, where $i \in (2, 3, \ldots, N)$.

c3: Obtain, by the terminal device, according to the interface shift threshold H and a transverse coordinate of the current coordinates of each control in the first layout file, coordinates of each control in the first layout file after being shifted, and calculate, according to the interface shift threshold H and the width value of the deletion button, coordinates of the deletion button after being shifted.

c4: Display, by the terminal device, according to the coordinates of each control in the first layout file after being shifted, and the coordinates of the deletion button after being shifted, each control in the first layout file and the deletion button on the email interface.

For example, an interface shift threshold H preset by the terminal device is 3, and a screen width Z of the terminal device is 50. If an email A is used as the aforementioned email for example, a first layout file of an email interface of the email A includes M controls (that is, B1, B2, and so forth until BM, where M is a natural number greater than 1), and a second layout file of the email interface of the email A includes a deletion button with a width W of 15. Meanwhile, the terminal device performs calculation according to formula 2 to obtain that the total number of times of shifting required for fully displaying the deletion button on the email interface is 5. It should be noted that, when a terminal device performs a shift on the email interface of the email A, each control in the first layout file corresponding to the email A needs to be shifted separately by using a same shifting method. Therefore, during the following shifting processes, a control B1 in the first layout file is used as an example for description. For example, initial coordinates of the control B1 are (0, 0, 50, 10).

If a terminal device implements a process of step 204c by using the first implementation manner as described above, the specific implementation process by the terminal device is as follows:

1) When a preset direction is towards the left, the terminal device acquires target coordinates of a deletion button included in a second layout file of the email A, namely, (35, 0, 15, 10), and determines, according to an interface shift threshold H and the current number i of times of shifting, an offset L of this shift, and then calculates, according to the offset L of this shift and by using formula 6, a transverse coordinate $x_a'$ ( ) of the control B1 after being shifted. Then, coordinates of the control B1 after being shifted are (0–L, 0, 50, 10). Meanwhile, after the terminal device calculates, according to the offset L of this shift and the width W of the deletion button, and by using formula 8, a transverse coordinate $x_b'$ ( ) of the deletion button after being shifted, the terminal device acquires coordinates of the deletion button after being shifted, namely, (50–L, 0, 15, 10). Finally, the terminal device invokes, according to the coordinates of the control B1 and deletion button after being shifted, an OnDraw function to separately update the control B1 and the deletion button on the email interface.

2) When a preset direction is towards the right, the terminal device acquires target coordinates of a deletion button included in a second layout file of the email A, namely, (0, 0, 15, 10), and determines, according to an interface shift threshold H and the current number i of times of shifting, an offset L of this shift, and then calculates, according to the offset L of this shift and by using formula 7, a transverse coordinate $x_a'$ ( ) of the control B1 after being shifted. Then, coordinates of the control B1 after being shifted are (0+L, 0, 50, 10). Meanwhile, after the terminal device calculates, according to the offset L of this shift and the width W of the deletion button, and by using formula 9, a transverse coordinate $x_b'$ ( ) of the deletion button after being shifted, the terminal device acquires coordinates of the deletion button after being shifted, namely, (L−15, 0, 15, 10). Finally, the terminal device invokes, according to the coordinates of the control B1 and deletion button after being shifted, an OnDraw function to separately update the control B1 and the deletion button on the email interface.

If a terminal device implements a process of step 204c by using the second implementation manner as described above, the specific implementation process by the terminal device is as follows:

1) When a preset direction is towards the left, the terminal device acquires target coordinates of a deletion button included in a second layout file of the email A, namely, (35, 0, 15, 10). When the current number i of times of shifting is equal to 1, it indicates that the email interface is shifted towards the left for the first time. In this case, for the calculation process of coordinates of a control in the first layout file after being shifted and coordinates of the deletion button after being shifted, refer to specific description in item 1) of the first implementation manner. When i is greater than 1, the terminal device separately acquires current coordinates of the control B1 and the deletion button, namely, (x3, 0, 50, 0) and (x4, 0, 15, 10), and separately shifts, according to an interface shift threshold H, transverse coordinates of the control B1 and the deletion button towards the left by H, to obtain coordinates of the control B1 and the deletion button after being shifted, namely, (x3−H, 0, 50, 0) and (x4−H, 0, 15, 10). The terminal device invokes, according to the coordinates of the control B1 and deletion button after being shifted, an OnDraw function to separately update the control B1 and the deletion button on the email interface. x3 is a current transverse coordinate of the control B1, and x4 is a current transverse coordinate of the deletion button.

2) When a preset direction is towards the right, the terminal device acquires target coordinates of a deletion button included in a second layout file of the email A, namely, (0, 0, 15, 10). When the current number i of times of shifting is equal to 1, it indicates that the email interface is shifted towards the right for the first time. In this case, for the calculation process of coordinates of a control in the first layout file after being shifted and coordinates of the deletion button after being shifted, refer to specific description in item 2) of the first implementation manner. When i is greater than 1, the terminal device separately acquires current coordinates of the control B1 and the deletion button, namely, (x3, 0, 50, 0) and (x4, 0, 15, 10), and separately shifts, according to an interface shift threshold H, transverse coordinates of the control B1 and the deletion button towards the right by H, to obtain coordinates of the control B1 and the deletion button after being shifted, namely, (x3+H, 0, 50, 0) and (x4+H, 0, 15, 10). The terminal device invokes, according to the coordinates of the control B1 and deletion button after being shifted, an OnDraw function to separately update the control B1 and the deletion button on the email interface.

205: Delete, when the terminal device detects a touch point in a deletion button region of the email interface, an email that corresponds to the email interface.

In an exemplary embodiment, step 205 further includes the following steps:

205a: Shift, by the terminal device, when the terminal device detects a touch point in a region other than a deletion button region, and according to the interface shift threshold, coordinates of each control in the first layout file after being shifted, in an opposite direction of the preset direction, and shift, according to the interface shift threshold and the width value of the deletion button, target coordinates of the deletion button in an opposite direction of the preset direction, so as to achieve sliding of the whole email content on the email interface in an opposite direction of the preset direction while hiding the deletion button.

For example, for the specific process of step 202 and step 205, refer to the description of step 102 and step 105 in the embodiment that corresponds to FIG. 1. The details are not described herein again.

For the method provided by this embodiment of the present disclosure, a terminal device acquires sliding trace information of a touch point; determines, according to the sliding trace information of the touch point, whether a sliding operation of the touch point meets a pre-determined condition; acquires, if the sliding operation of the touch point meets the pre-determined condition, initial coordinates of each control in a first layout file of an email interface where the touch point is located, and target coordinates of a deletion button in a second layout file of the email interface; then acquires a preset interface shift threshold; shifts, according to the preset interface shift threshold, the initial coordinates of each control in the first layout file in a preset direction, and shifts, according to the interface shift threshold and the width value of the deletion button, the deletion button in a preset direction to the target coordinates of the deletion button; and deletes, when the mobile terminal detects a touch point in a deletion button region of the email interface, an email that corresponds to the email interface.

Accordingly, in the present disclosure, when a terminal device determines that a sliding operation of a touch point meets a pre-determined condition, the terminal device shifts, according to acquired interface shift threshold, initial coordinates of each control in a first layout file in a preset direction, and shifts, according to the acquired interface shift threshold and a width value of a deletion button, the deletion button in a preset direction to target coordinates of the deletion button, so as to allow the whole email content on an email interface to slide in a preset direction while a deletion button is displayed on the email interface for deleting a selected email, thereby achieving deletion of a selected email by means of sliding on the terminal device, which is operationally convenient and fast, has a simple deletion interface, and effectively avoids a false triggering. In addition to solving a problem in an existing ANDROID™ platform that an email deletion method is operationally complex and easily causes a mis-operation, which leads to a poor user experience, the email deletion method is simplified and maintains consistent with a system style of a mobile phone, thereby improving the user experience.

Figure 3:
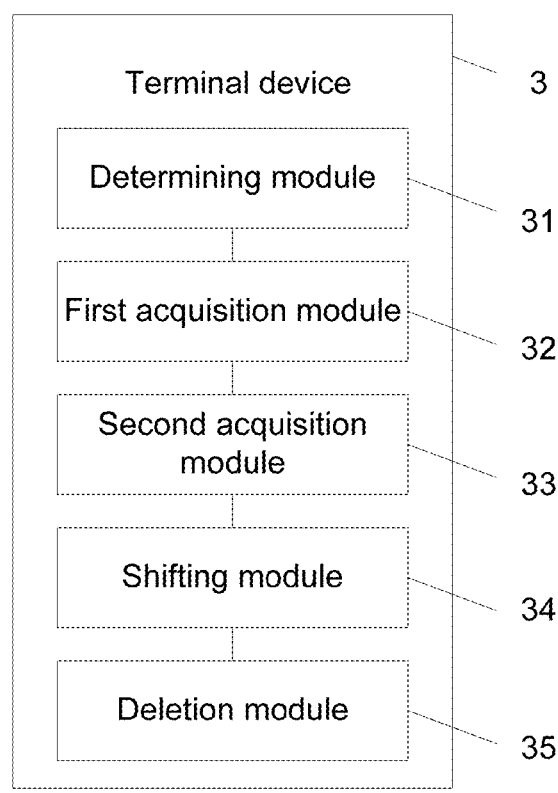
FIG. 3 is a schematic structural diagram of a terminal device according to an embodiment of the present disclosure.

An embodiment of the present disclosure provides a terminal device 3 that is installed with an ANDROID™ system. As shown in FIG. 3, the terminal device 3 includes: a determining module 31, a first acquisition module 32, a second acquisition module 33, a shifting module 34 and a deletion module 35.

The determining module 31 is configured to acquire, when the terminal device 3 detects that a touch point slides in a preset direction on the email interface that is currently displayed by the terminal device 3, sliding trace information of the touch point, and determine, according to the sliding trace information of the touch point, whether a sliding operation of the touch point meets a pre-determined condition.

The first acquisition module 32 is configured to acquire, if the determining module 31 determines that a sliding operation of a touch point meets the pre-determined condition, initial coordinates of each control in a first layout file of an email interface where the touch point is located, and target coordinates of a deletion button in a second layout file of the email interface, where the target coordinates of the deletion button are coordinates of the deletion button when being fully displayed on the email interface, and include a width value of the deletion button.

The second acquisition module 33 is configured to acquire a preset interface shift threshold.

The shifting module 34 is configured to shift, according to the interface shift threshold acquired by the second acquisition module, the initial coordinates of each control in the first layout file that are acquired by the first acquisition module, in a preset direction and shift, according to the interface shift threshold and the width value of the deletion button, the deletion button in a preset direction to the target coordinates of the deletion button.

The deletion module 35 is configured to delete, when the terminal device detects a touch point in a deletion button region of the email interface, an email that corresponds to the email interface.

Figure 4:
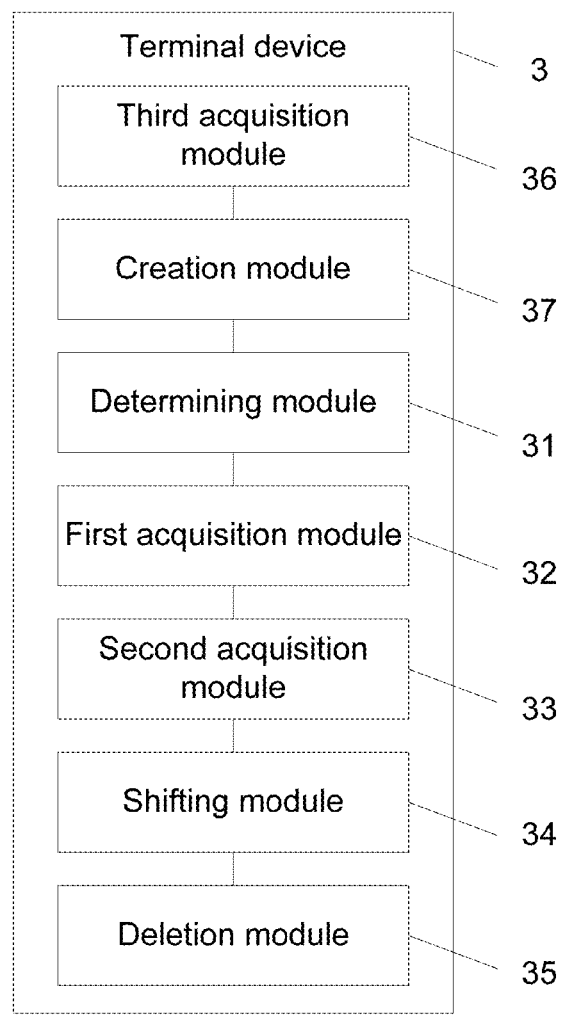
FIG. 4 is a schematic structural diagram of another terminal device according to an embodiment of the present disclosure.

In an exemplary embodiment, as shown in FIG. 4, the terminal device further includes: a third acquisition module 36 and a creation module 37.

The third acquisition module 36 is configured to acquire, when the terminal device displays the email on a mailbox interface, a first layout file of an email interface of the email.

The creation module 37 is configured to create, according to the first layout file of the email interface of the email that is acquired by the third acquisition module, a second layout file with the same content as the first layout file for the email, and add a layout parameter of a deletion button in the second layout file, where the layout parameter of the deletion button includes target coordinates and layout information of the deletion button, and the layout information of the deletion button is used for indicating a display position of the deletion button on the email interface of the email.

Figure 5:
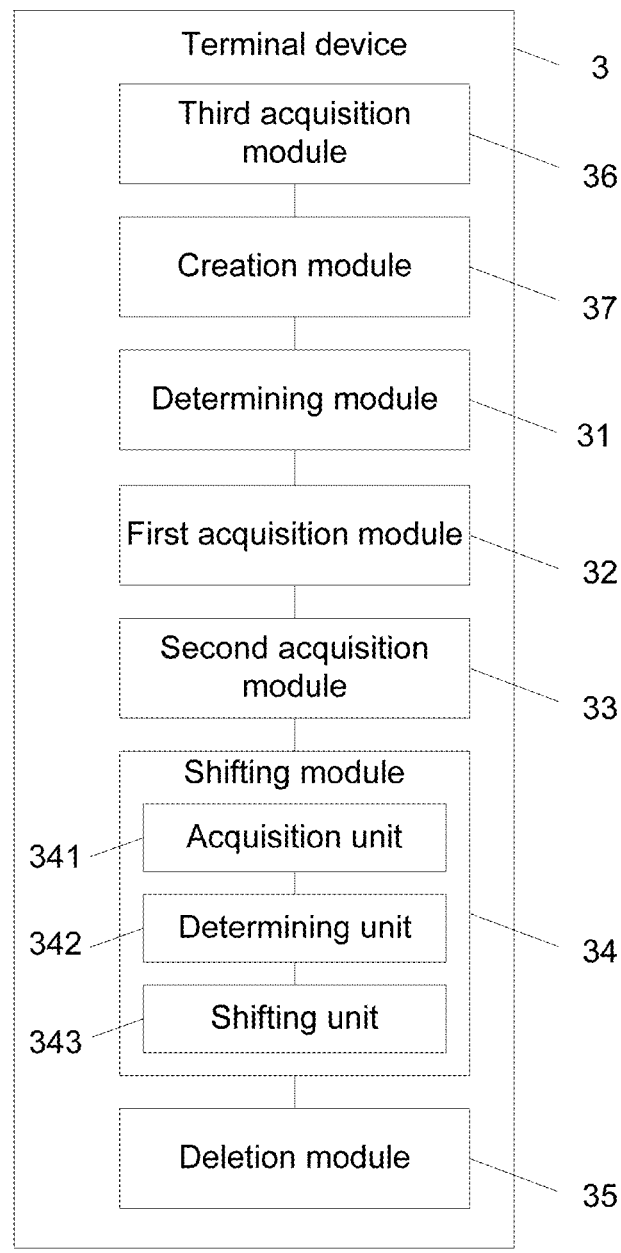
FIG. 5 is a schematic structural diagram of still another terminal device according to an embodiment of the present disclosure.

In an exemplary embodiment, as shown in FIG. 5, the shifting module 34 includes an acquisition unit 341, a determining unit 342, and a shifting unit 343.

The acquisition unit 341 is configured to acquire a pre-configured interface shift threshold H, a shifting cycle and a width value W of the deletion button, where the interface shift threshold H is an offset of an email interface during each shift, and the shifting cycle is a time interval of shifting an email interface.

The determining unit 342 is configured to determine, according to a width value W of a deletion button in a second layout file and an interface shift threshold H, the desired number N of times of shifting an email interface, where N is a natural number greater than or equal to 1, and.

The shifting unit 343 is configured to shift, according to the number N of times of shifting determined by the determining unit 342 and the shifting cycle acquired by the acquisition unit 341, and based on the interface shift threshold H acquired by the acquisition unit 341, the initial coordinates of each control in the first layout file in a preset direction for N times, and shift, according to the interface shift threshold H and the width value of the deletion button that are acquired by the acquisition unit 341, the deletion button in a preset direction for N times to the target coordinates of the deletion button.

In an exemplary embodiment, the shifting unit 343 is specifically configured to:

calculate, when the terminal device performs an ith shift on an email interface, and according to an interface shift threshold H and the current number i of times of shifting, a current offset L of the email interface, where, and i=(1, 2, and so forth until N); obtain, according to the current offset of the email interface and a transverse coordinate of initial coordinates of each control in the first layout file, coordinates of each control in the first layout file after being shifted, and calculate, according to the current offset of the email interface and the width value of the deletion button, coordinates of the deletion button after being shifted; and display, according to the coordinates of each control in the first layout file after being shifted, each control in the first layout file on the email interface, and display, according to the coordinates of the deletion button after being shifted, the deletion button on the email interface, where the ith shift is any one shift performed on the email interface.

In an exemplary embodiment, the deletion module 34 is further configured to:

shift, when the terminal device detects a touch point in a region other than a deletion button region, and according to the interface shift threshold, coordinates of each control in the first layout file after being shifted, in an opposite direction of the preset direction, and shift, according to the interface shift threshold and the width value of the deletion button, target coordinates of the deletion button in an opposite direction of the preset direction, so as to achieve sliding of the whole email content on the email interface in an opposite direction of the preset direction while hiding the deletion button.

In an exemplary embodiment, the determining module 31 is specifically configured to:

acquire initial position information of a touch point and target position information of the touch point after sliding;

acquire, according to the initial position information of the touch point and the target position information of the touch point after sliding, a transverse offset and a longitudinal offset of the touch point; and indicate, when the transverse offset of the touch point is greater than a first pre-determined threshold, and the longitudinal offset of the touch point is less than a second pre-determined threshold, that a sliding operation of the touch point meets a pre-determined condition.

For the terminal device provided by this embodiment of the present disclosure, the terminal device acquires sliding trace information of a touch point; determines, according to the sliding trace information of the touch point, whether a sliding operation of the touch point meets a pre-determined condition; acquires, if the sliding operation of the touch point meets the pre-determined condition, initial coordinates of each control in a first layout file of an email interface where the touch point is located, and target coordinates of a deletion button in a second layout file of the email interface; then acquires a preset interface shift threshold; shifts, according to the preset interface shift threshold, the initial coordinates of each control in the first layout file in a preset direction, and shifts, according to the interface shift threshold and a width value of the deletion button, the deletion button in a preset direction to the target coordinates of the deletion button; and deletes, when the mobile terminal detects a touch point in a deletion button region of the email interface, an email that corresponds to the email interface.

Figure 7:
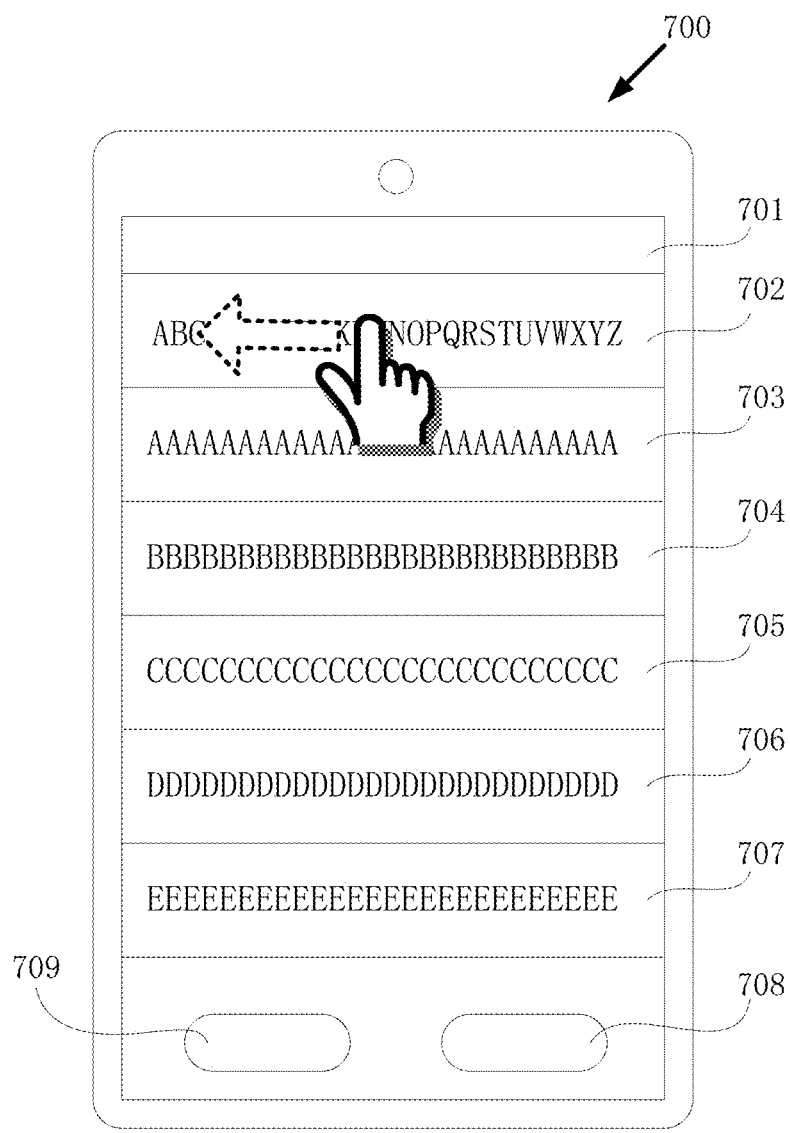
FIG. 7 is a schematic diagram of an exemplary embodiment for a terminal device.

FIG. 7 illustrates an exemplary embodiment of a terminal device 700. The terminal device 700, which may be a mobile phone or tablet PC, includes a screen 701 for presenting a graphical user interface and detecting touch operation on the touch screen. The graphical user interface includes multiple records of emails, such as email 702, email 703, email 704, email 705, email 706 and email 707, and two touch buttons 708 and 709.

Figure 8:
FIG. 8 is a schematic diagram illustrating a middle status of the embodiment in FIG. 7.
Figure 9:
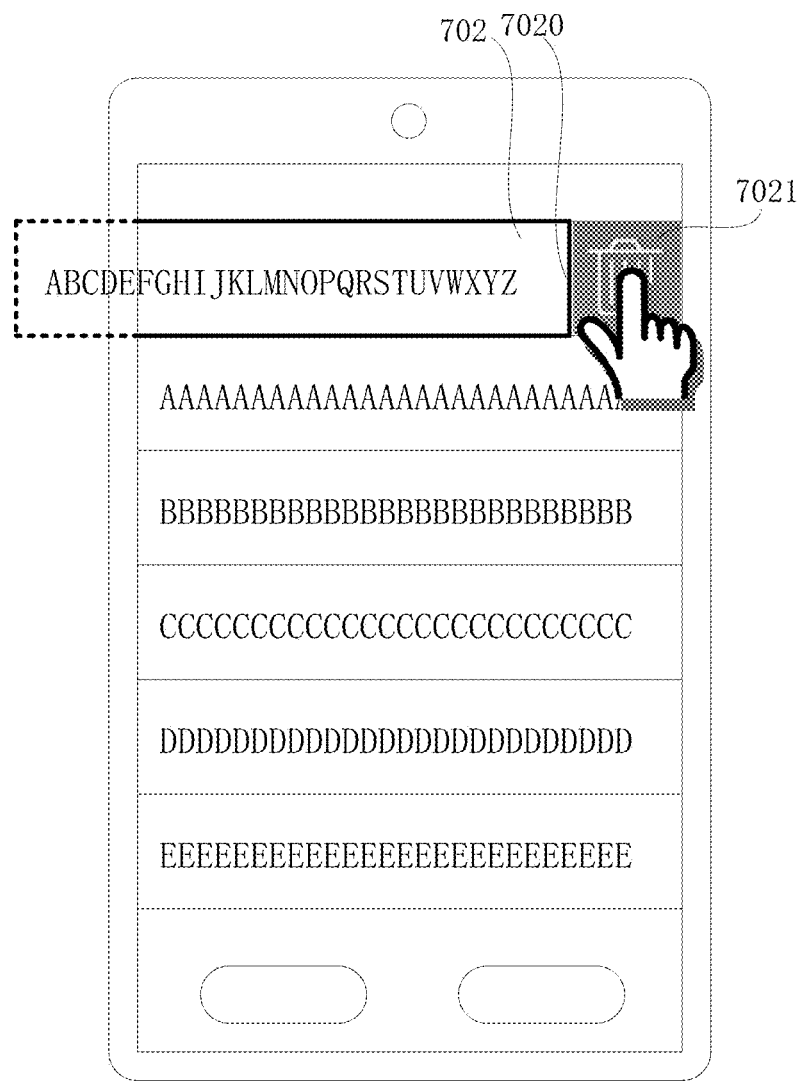
FIG. 9 is a schematic diagram illustrating an accomplished status of the embodiment in FIG. 7.

When a user wants to delete email 702, the user may touch the screen where the email 702 is located and slide towards one side of the device to drag the email 702, for example, sliding towards the left side of the device as shown in FIG. 7. When the email 702 was dragged, a touch button 7021 will be presented following the movement of the email 702, which can be seen from FIG. 8 and FIG. 9. Subsequently, the user can touch the button 7021 to delete the email 702.

In order to facilitate the identification of the email, in one embodiment, the corresponding edge of the email being dragged may close to the touch button, so that the email being dragged can be seen at least part of it, and the user can tell which email is being operating to avoid mis-operation. For example, in FIG. 9, the right edge 7020 of the email 702 is close to the button 7021, and also in FIG. 10, the right edge 7020 is close to the button 7022.

Figure 10:
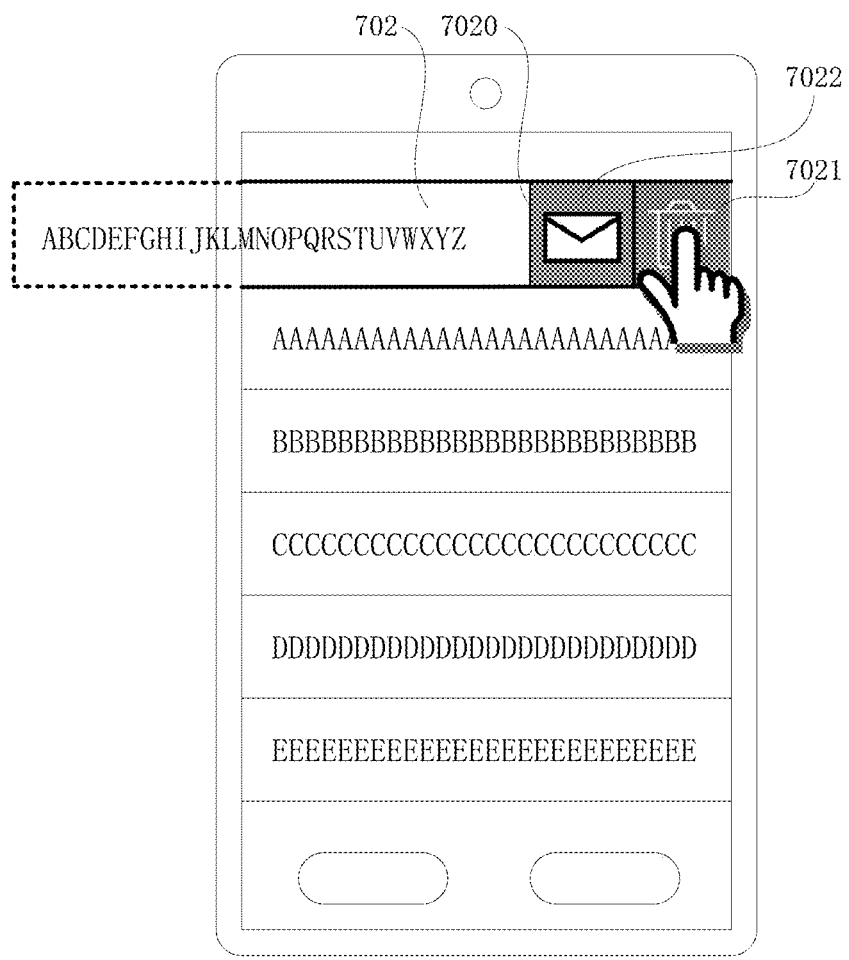
FIG. 10 is a schematic diagram illustrating another accomplished status of the embodiment in FIG. 7.

In one embodiment of present disclosure, there may be several touch buttons following the drag of an email. For example, a touch button 7022 with the function of marking the email to an unread status may also follow the email 702 as shown in FIG. 10.

In one embodiment of present disclosure, when the touch and slide operation is a mis-operation, the user may drag the email back to hide the touch buttons, such as button 7021 and 7022.

Figure 11:
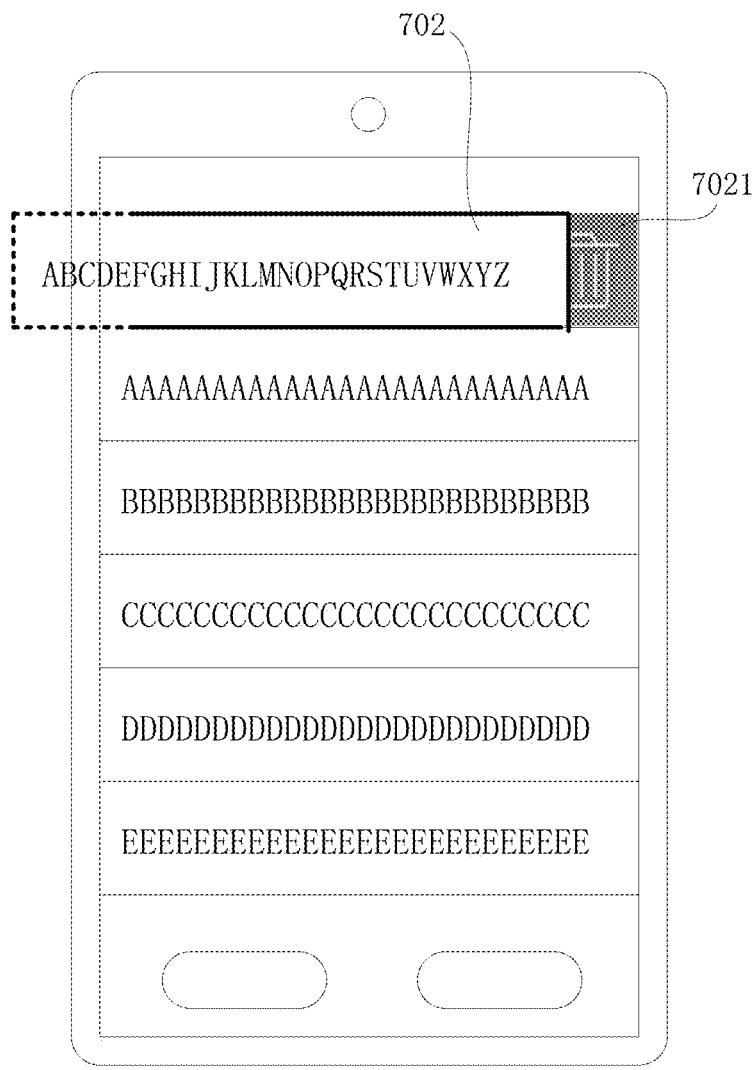
FIG. 11 is a schematic diagram illustrating another middle status of the embodiment in FIG. 7.

In one embodiment of present disclosure, when the email is touched and slide towards one side of the device, the touch buttons, like the button 7021 and 7022 of above embodiment, will be displayed and not follow the movement of the email as shown in FIG. 11, so that the overall visual effect on the screen resembles that the touch button and the email are displayed in different layer, for example, the touch button is displayed at bottom layer and the email is displayed at the top layer, when the top layer is dragged away, the bottom layer will appear gradually corresponding to the dragging operation to the top layer.

The touch button may be a deletion button configured to delete the email 702. When the user press the touch button, the device may first remove and/or delete only a visual presentation of the email 702, and then after a predetermined period of time, delete the actual email data from the device. For example, when the user touch the deletion button, the device may first visually make the email 702 disappeared from the listed of emails, such as email 702, email 703, email 704, email 705, email 706 and email 707, but in fact do not delete the actual data of the email 702, and then wait for the predetermined period of time, e.g., 12 hours, to delete the data corresponding to the email 702 from the device, which is saved in a storage medium (e.g., a hard disk, memory, or a non-transitory storage medium) of the terminal device.

Descriptions above are just an example implementation in the present disclosure to help understanding the present disclosure. One of ordinary skill in the art should understand that the example implementation is non-limiting and does not limit the present disclosure to be carried out in another way.

According to the method for deleting an email and the terminal device provided by the embodiments of the present disclosure, a terminal device acquires sliding trace information of a touch point; determines, according to the sliding trace information of the touch point, whether a sliding operation of the touch point meets a pre-determined condition; acquires, if the sliding operation of the touch point meets the pre-determined condition, initial coordinates of each control in a first layout file of an email interface where the touch point is located, and target coordinates of a deletion button in a second layout file of the email interface; then acquires a preset interface shift threshold; shifts, according to the preset interface shift threshold, the initial coordinates of each control in the first layout file in a preset direction, and shifts, according to the interface shift threshold and a width value of the deletion button, the deletion button in a preset direction to the target coordinates of the deletion button; and deletes, when the mobile terminal detects a touch point in a deletion button region of the email interface, an email that corresponds to the email interface.

Compared to the traditional technology, in the present disclosure, when a terminal device determines that a sliding operation of a touch point meets a pre-determined condition, the terminal device shifts, according to an acquired interface shift threshold, initial coordinates of each control in a first layout file in a preset direction, and shifts, according to the acquired interface shift threshold and a width value of a deletion button, the deletion button in a preset direction to target coordinates of the deletion button, so as to allow the whole email content on an email interface to slide in a preset direction while a deletion button is displayed on the email interface for deleting a selected email, thereby achieving deletion of a selected email by means of sliding on the terminal device, which is operationally convenient and fast, has a simple deletion interface, and effectively avoids a false triggering. In addition to solving a problem in an existing ANDROID™ platform that an email deletion method is operationally complex and easily causes a mis-operation, which leads to a poor user experience, the email deletion method is simplified and maintains consistent with a system style of a mobile phone, thereby improving the user experience.

Compared to the traditional technology, in the present disclosure, when a terminal device determines that a sliding operation of a touch point meets a pre-determined condition, the terminal device shifts, according to an acquired interface shift threshold, initial coordinates of each control in a first layout file in a preset direction, and shifts, according to the acquired interface shift threshold and a width value of a deletion button, the deletion button in a preset direction to target coordinates of the deletion button, so as to allow the whole email content on an email interface to slide in a preset direction while a deletion button is displayed on the email interface for deleting a selected email, thereby achieving deletion of a selected email by means of sliding on the terminal device, which is operationally convenient and fast, has a simple deletion In addition to solving a problem in an existing ANDROID™ platform that an email deletion method is operationally complex and easily causes a mis-operation, which leads to a poor user experience, the email deletion method is simplified and maintains consistent with a system style of a mobile phone, thereby improving the user experience.

A person skilled in the art can clearly understand that, for convenient and brief description, the above functional modules are only described for exemplary purposes. In actual applications, the functions may be allocated to different functional modules according to specific needs, that is, the internal structure of the apparatus is divided to different functional modules to complete all or some of the above described functions. For the specific work process of the foregoing systems, apparatuses and units, refer to a corresponding process in the foregoing method embodiments, and the details are not described herein again.

In the provided embodiments of the present disclosure, it should be understood that, the disclosed apparatuses and methods may be implemented in another manner. For example, the foregoing apparatus embodiments are only for schematic purposes. For example, division of the modules or units is merely a division of logical functions, and another division manner may be adopted in practical implementation. For example, multiple units or components may be combined or integrated into another system, or some features may be omitted or not executed. Another point is that the displayed or discussed mutual coupling or direct coupling or communication connection may be an indirect coupling or communication connection by using some interfaces, apparatuses or units.

In addition, the functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

In the above description, the foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present disclosure.

The invention claimed is:

1. A terminal device, comprising:
    a touch screen,
    a processor-readable storage medium including a set of instructions; and
    a processor in communication with the processor-readable storage medium and the touch screen, wherein when executing the set of instructions, the processor is directed to:
        display an email user interface showing a list of plurality of emails on the touch screen;
        detect, on the email user interface displayed on the touch screen, a sliding operation on a first touch point on an email of the list of the plurality of emails in a preset direction to slide the email towards the preset direction for revealing a deletion button;
        acquire initial coordinates of the first touch point on the email, target coordinates of first touch point on the email after the sliding operation, and a transverse offset and a longitudinal offset of the first touch point, wherein the transverse offset of the first touch point is an absolute value of a difference between transverse coordinates of the initial coordinates of the first touch point and the target coordinates of the first touch point after the sliding operation, and wherein the longitudinal offset of the first touch point is an absolute value of a difference between longitudinal coordinates of the initial coordinates of the first touch point and the target coordinates of the touch point after the sliding operation;
        indicate that the sliding operation of the first touch point on the email meets a predetermined condition when the transverse offset of the first touch point is greater than a first predetermined threshold and the longitudinal offset of the first touch point is less than a second predetermined threshold, and start a timer for a shifting cycle, wherein the shifting cycle is a time interval of shifting the email by one interface shift threshold;
        acquire a preset interface shift threshold, the shifting cycle, and target coordinates of the deletion button, wherein an interface shift threshold is a number of pixel points offset of the email during each shift of the email, and the target coordinates of the deletion button are coordinates of the deletion button when being fully revealed on an edge of the email in an opposite direction of the preset direction after sliding the whole email out to the preset direction, and the target coordinates comprise the width of the deletion button;
        determine a number of times of shifting the email based on the preset interface shift threshold and the width of the deletion button;
        shift the email among the list of the plurality of the emails and the deletion button in the preset direction for the number of times of shifting the email based on the preset interface shift threshold;
        fully reveal the deletion button on the edge of the email in the opposite direction of the preset direction following the slide of the whole email towards the preset direction;
        in response to a detection of a second touch point in a region corresponding to the deletion button of the email, delete the email from being displayed on the email user interface, and delete actual data corresponding to the email from a storage medium of the terminal device after a predetermined period of time; and
        in response to the detection of the second touch point in a region other than the deletion button, shift the email and the deletion button in the opposite direction of the preset direction to hide the delete button, and achieve sliding of the whole email content on the email user interface in the opposite direction of the preset direction while hiding the deletion button.

2. The terminal device according to claim 1, wherein, when displaying the email user interface, the processor is further directed to:
    acquire a first layout file of the email interface;
    generate, according to the first layout file, a second layout file with the same content as the first layout file; and
    add a layout parameter for the deletion button in the second layout file,
    wherein the layout parameter for the deletion button comprises the target coordinates and layout information of the deletion button, and the layout information of the deletion button is configured to specify a display position of the deletion button on the email interface of the email; and wherein displaying the email interface comprises periodically refreshing the email interface according to the first layout file and the second layout file.

3. The terminal device according to claim 2, wherein to shift the email and the deletion button, the processor is further directed to:
calculate a position of the email and a position of the deletion button in the email user interface at each shift; and
update the first layout file with the position of the email in the email interface and update the second layout file with the position of the deletion button in the email interface at each shift.

4. A method for deleting an email, comprising:
displaying, by a terminal device, an email user interface showing a list of plurality of emails on a touch screen of the terminal device;
detecting, by the terminal device on the email user interface displayed on the touch screen, a sliding operation on a first touch point on an email of the list of the plurality of emails in a preset direction to slide the email towards the preset direction for revealing a deletion button;
acquiring, by the terminal device, initial coordinates of the first touch point on the email, target coordinates of first touch point on the email after the sliding operation, and a transverse offset and a longitudinal offset of the first touch point, wherein the transverse offset of the first touch point is an absolute value of a difference between transverse coordinates of the initial coordinates of the first touch point and the target coordinates of the first touch point after the sliding operation, and wherein the longitudinal offset of the first touch point is an absolute value of a difference between longitudinal coordinates of the initial coordinates of the first touch point and the target coordinates of the touch point after the sliding operation;
indicating, by the terminal device, that the sliding operation of the first touch point on the email meets a predetermined condition when the transverse offset of the first touch point is greater than a first predetermined threshold and the longitudinal offset of the first touch point is less than a second predetermined threshold, and start a timer for a shifting cycle, wherein the shifting cycle is a time interval of shifting the email by one interface shift threshold;
acquiring, by the terminal device, a preset interface shift threshold, the shifting cycle, and target coordinates of the deletion button, wherein an interface shift threshold is a number of pixel points offset of the email during each shift of the email, and the target coordinates of the deletion button are coordinates of the deletion button when being fully revealed on an edge of the email in an opposite direction of the preset direction after sliding the whole email out to the preset direction, and the target coordinates comprise the width of the deletion button;
determining, by the terminal device, a number of times of shifting the email based on the preset interface shift threshold and the width of the deletion button;
shifting, by the terminal device, the email among the list of the plurality of the emails and the deletion button in the preset direction for the number of times of shifting the email based on the preset interface shift threshold;
fully revealing, by the terminal device, the deletion button on the edge of the email in the opposite direction of the preset direction following the slide of the whole email towards the preset direction;
in response to a detection of a second touch point in a region corresponding to the deletion button of the email, deleting, by the terminal device, the email from being displayed on the email user interface, and delete actual data corresponding to the email from a storage medium of the terminal device after a predetermined period of time; and
in response to the detection of the second touch point in a region other than the deletion button, shifting, by the terminal device, the email and the deletion button in the opposite direction of the preset direction to hide the delete button, and achieve sliding of the whole email content on the email user interface in the opposite direction of the preset direction while hiding the deletion button.

5. The method according to claim 4, wherein, when the terminal device displays on the email user interface, the method further comprises:
acquiring, by the terminal device, a first layout file of the email interface;
generating, by the terminal device according to the first layout file, a second layout file with the same content as the first layout file; and
adding, by the terminal device, a layout parameter for the deletion button in the second layout file,
wherein the layout parameter for the deletion button comprises the target coordinates and layout information of the deletion button, and the layout information of the deletion button is configured to specify a display position of the deletion button on the email interface of the email; and
wherein displaying the email interface comprises periodically refreshing the email interface according to the first layout file and the second layout file.

6. The method according to claim 5, wherein the shifting of the email and the deletion button comprises:
calculating a position of the email and a position of the deletion button in the email user interface at each shift; and
updating the first layout file with the position of the email in the email interface and update the second layout file with the position of the deletion button in the email interface at each shift.

\* \* \* \* \*